3,262,996
HOT MELT ADHESIVE CONTAINING A POLAR SYNTHETIC ELASTOMER AND AN AROMATIC HYDROCARBON-ALDEHYDE RESIN
Stewart S. Kurtz, Jr., Merion Station, and Melvin E. Peterkin, Brookhaven, Pa., assignors to Sun Oil Company, Philadelphia, Pa., a corporation of New Jersey
No Drawing. Filed Nov. 6, 1962, Ser. No. 235,837
3 Claims. (Cl. 260—887)

This invention relates to hot melt adhesive compositions. In particular it relates to hot melt adhesive compositions having high performance properties which are prepared from low cost ingredients.

Hot melt adhesives produce a bond by simple cooling as distinguished from crosslinking or other chemical reaction. Prior to heating the adhesives are thermoplastic solid materials. Upon heating they melt rather sharply and flow freely and they can be remelted after cooling.

Hot melt adhesives are used for bonding wood, paper, plastics, textiles and other materials. A particular use is in the fabrication of paper cartons. Hot melts for boxboard must have high bond strength under conditions of shock, high humidity and temperature extremes encountered in transportation and storage encountered by paper cartons. In addition melt point, setting time, pot life and general handling qualities in automatic box making machinery are essential requirements.

We have found that the object of providing a high performance-low cost hot melt adhesive can be obtained by blending a hydrocarbon-aldehyde resin with an elastomer in certain proportions. In another embodiment, a plasticizer is included to provide a three component system.

Aromatic hydrocarbon-aldehyde resins are well known in the art. They are made by condensing an aldehyde with an aromatic hydrocarbon or a petroleum fraction containing aromatic hydrocarbons. These condensation products are called formolite or formolite-type resins and the latter terms will be used in this context throughout the specification.

Copending application Serial Number 117,797, filed June 19, 1961, and now abandoned, which is assigned to the same interests, discloses a method of preparing formolite-type resins. Details of the process of the copending application are as follows:

*Feedstocks.*—Aromatic hydrocarbon fractions boiling in the range of from about 200° F. to 950° F. derived from petroleum refinery streams such as cracked fractions, cycle streams, hydroformer bottoms, fuel oil, straight run distillates and pure aromatic fractions. The gas oil fraction from catalytic cracking, boiling in the range of 450–650° F. and containing 15 to 50% aromatic hydrocarbons is a particularly preferred feedstock.

*Aldehyde.*—Suitable aldehydes are formaldehyde and materials which yield formaldehyde under the conditions of the reaction such as formalin, paraformaldehyde, trioxymethylene and trioxane. Of this group formaldehyde and paraformaldehyde are preferred because of availability and handling ease. Other aldehydes such as acetaldehyde, propionaldehyde and butyraldehyde can be used. The aldehyde is used in amounts ranging from 1.0 to 10 wt. percent based on the oil charged.

*Catalyst.*—Many catalysts have been used for the formolite reaction including $H_2SO_4$, HF, formic acid, phosphoric acid, $BF_3$, metal chlorides and other acid acting catalysts. Superior results are obtained using formic or acetic acid complexed with $BF_3$. Acid concentrations ranging from 70–100% acid can be used. The acid serves both as a catalyst component and as a solvent. The total acid (catalyst and solvent) is used in amounts ranging from .1 to 50 percent based on the weight of oil charged.

The acid complex is preferably used in amounts ranging from 1.0 to 20.0 wt. percent based on the oil charged. The mol ratio of $BF_3$ to acid in the complex can vary from 1:1 to 1:3.

*Conditions.*—Suitable conditions include temperatures in the range of 10–200° C., preferably 80–150° C.; pressures in the range of 10–250 p.s.i.a., preferably 40–120 p.s.i.a. Reaction times can vary in the range of 10 minutes to 10 hours.

Conventional equipment is used and the process can be batch or continuous.

The following non-limiting examples describe a preferred embodiment of the invention.

EXAMPLE I

The formolite resin was prepared in the following manner: twelve gallons of catalytic gas oil having a boiling range of 400 to 650° F. and containing 43% aromatics (GEL) were placed in a 20 gallon glass lined reactor equipped with a turbine agitator.

Next 4 pounds of paraformaldehyde and two gallons of acetic acid solvent were added and the mixture heated to 200° F. by means of a hot oil bath. In a separate reaction vessel 4.56 pounds of $BF_3$ were complexed with 0.80 gallon of acetic acid. The catalyst complex was added to the other ingredients. Temperature was maintained at about 220° F. No pressure was applied. After 15 minutes, heating was discontinued and the acid layer was drawn off. The remaining reactor contents were washed 3 times with 750 ml. $H_2O$, followed by three additional washings with 4 gallons of $H_2O$. The water was decanted and the reactor contents transferred to vacuum distillation apparatus. The following cuts were separated; initial boiling point to 651° F.–62.8% (this is considered as unreacted feed), 652–814° F.–5.1%, 815–901° F.–10.9% and >901° F.–21.1%. The 652–814° F. fraction is a light yellow liquid resin and it can be used as the plasticizing ingredient of the hot melt adhesive. The distillation bottoms boiling above 901° F. and having a ring and ball melt point of 129° C. is the hard resin component of our adhesive. The 815–901 fraction is a soft resin having a ring and ball melt point of 45–50° C. This latter material was not used in the adhesive composition of the invention because of its degrading effect on the properties of the composition, but can be recycled to a subsequent reaction to be upgraded to hard resin.

Hard resins having a ring and ball melt point of 165° F. to 350° F. are suitable for our composition.

Liquid plasticizer resins having boiling ranges of 400° to 900° F. preferably 615° to 814° F. can be employed.

In addition to the plasticizer resins derived from the formolite reaction, other suitable plasticizers include the phthalates, such as butyl benzyl phthalate, butyl cyclohexyl phthalate, phosphate esters, such as tricresyl phosphate, cresyl diphenyl phosphate, sulfonamides, chlorinated biphenyls, etc. These can be selected from the multitude of adhesive plasticizers available on the basis of compatibility, processing characteristics, stability and cost.

The hot melt adhesive is made by heating the elastomer in a mixing chamber to about 250° F. and adding the hard resin and plasticizer in increments under shear type mixing. The composition is blended at about 300° F. for approximately one-half hour. On cooling the composition is a semi-flexible solid having practically no odor. For application to a surface the resin is heated to a temperature in the range of 250° to 450° F. and applied to the surfaces which are to be joined in any suitable manner. Suitable relative amounts of ingredients are from about 5 to about 60 wt. percent elastomer, from about 0 to about 25 wt. percent plasticizer and from about 40 to about 95 wt. percent hard resin. Preferred ranges with the broad ranges are 5-45 wt. percent elastomer, 1-15 wt. percent plasticizer and 40 to 96 wt. percent hard resin.

Certain synthetic elastomers are employed as ingredients in the hot melt adhesive of the invention. Rubbers containing polar groups such as aromatic groups or functional groups are compatible with the aromatic resins of the invention. Particularly suitable functional groups include nitrile groups, carboxyl groups, keto groups and halogens.

Butadiene-styrene copolymers which are manufactured commercially under such names as GR-S-1000, GR-S-1500, GR-S-1600 and the like as well as rubbery copolymers of butadiene with acrylic nitriles e.g. acrylonitrile, acrylates and ketones. Instead of butadiene, dienes such as dimethyl butadiene and 2-chlorobutadiene can be used. Instead of styrene, alkenyl-substituted aromatic compounds like alpha-methylstyrene, vinylnaphthalene, dimethylstyrene and vinyl toluene can be used.

Other synthetic rubbers include the neoprene rubbers i.e. rubbers prepared from chloroprene and ternary copolymer rubbers containing acrylonitrile, butadiene and styrene.

Particularly suitable rubbers are those selected from the group consisting of copolymers of a conjugated diolefin and an alkenyl ($CH_2=C<$) substituted aromatic compound, copolymers of a conjugated diolefin with an acrylic nitrile having the general formula

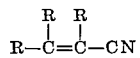

wherein R can be hydrogen or a $C_1-C_6$ hydrocarbon, and polymers of chloroprene. More specifically rubbers selected from the group consisting of butadiene-styrene copolymers, butadiene-acrylonitrile copolymers and chloroprene polymers can be used as the elastomer or rubber component of the adhesives of the invention.

These elastomers have a Mooney viscosity ranging from 30 to 80 and are usually solids at ambient temperature. Molecular weights range from about 30,000 to about 1,000,000. Elastomers having higher molecular weights and Mooney viscosities can be plasticized or mechanically broken down to a more suitable condition.

In one embodiment of the invention the rubber-resin mixture is milled on a close set rubber or paint mill. This mastication softens and breaks down the rubber so that the flow characteristics are improved. Milling is carried out at temperatures in the range of 60-200° F. for times of 5 minutes to three hours.

Essentially non-polar or saturated rubbers such as natural rubber, butyl rubber and ethylene-propylene copolymer rubber are not sufficiently compatible with the resins to give suitable adhesives.

EXAMPLE 2

The following description and table show the properties of hot melt adhesives prepared according to the invention.

The tensile strength and peel strength values were obtained on a Tinius-Olsen machine. The samples were 1.0 inch wide cloth strips bonded with the adhesive to provide a 1.0 square inch overlap. For tensile tests the samples were pulled in a vertical direction at a crosshead speed of 0.2 inch per minute. For peel tests the samples were pulled in a vertical direction, with the bond in a generally horizontal plane, at a rate of 2.0 inches per minute. The letter W after a value in the table indicates that the cloth strip failed before the bond. Flow test values were obtained by placing a pellet of the adhesive having a volume of 0.290 cc. between sheets of paper and plastic film, applying a 2.5 pound weight, and heating on a hot plate at constant temperature for a defined period of time. The area of the resultant film is the flow test value.

The elastomer component of the following examples was "GR-S-1500" which is a commercially available copolymer of butadiene and styrene manufactured by emulsion polymerization at 43° F. using a soap of a rosin acid, a sugar-free iron activated system and a carbamate shortstop. The Mooney viscosity of the copolymer was 46-58 (ML 212° F. @ 4 min.). In addition to GR-S-1500, some samples contain "Hycar 1072," a commercially available butadiene-acryonitrile copolymer with medium high acrylonitrile content and containing carboxyl groups. The Mooney viscosity is 35-60.

Table I

| | Percent Composition | | | | Tensile (p.s.i.) | | | Peel (max.) (lbs./in.) | | | Flow, cm.² at 15 sec. and 2½ lbs. | | | |
| --- | --- | --- | --- | --- | --- | --- | --- | --- | --- | --- | --- | --- | --- | --- |
| | GRS | NR | Plasticizer | Resin | 75° F. | 120° F. | 150° F. | 75° F. | 120° F. | 150° F. | 300° F. | 350° F. | 400° F. | 450° F. |
| A | 13 | | 11 | 76 | 290W | 20 | 2 | 15 | 14 | 1.1 | 12.5 | 19.5 | 23 | 27 |
| B | 20 | | 5 | 75 | 365W | 36 | 3 | 15 | 11 | 5.7 | 6.2 | 9.6 | 11.9 | 13.9 |
| C | 80 parts composition B + 20 parts TiO₂ | | | | 330W | 29 | 3 | 15 | 16 | 3.8 | 8.0 | 10.2 | 18.1 | 24.6 |
| D | 22 | | 11 | 67 | 75 | 30 | 5 | 23 | 5 | 0.7 | 7.5 | 9.6 | 11.3 | 13.9 |
| E | 30 | | | 70 | 190W | 37 | 4 | 35 | 24 | 8 | 4.9 | 6.2 | 7.1 | 9.6 |
| F | 17 | 8.5 | 4.5 | 69 | 360W | 20 | 3 | 32 | 18 | 4.7 | 5.3 | 6.2 | 7.1 | 9.6 |
| G | 18.5 | 9.5 | | 72 | 375W | 110 | 10 | 15 | 27 | 15 | 3.8 | 5.3 | 7.1 | 9.1 |
| H | | 30 | | 70 | 365W | 132 | 39 | 11 | 15 | 26 | | 2.0 | 3.1 | 4.5 |
| I | | 30 | | 70 | 270W | | | 11 | | | | 4.8 | 6.2 | 11.3 |

Compositions A-D show the properties of adhesives containing rubber, resin and plasticizer. Composition C shows the effect of adding titanium dioxide filler. Adhesives A-D have good low temperature bond strength and flow freely on the adherend at application temperatures above 300° F. The addition of filler provides a material having better flow characteristics without significantly lowering bond strength. Adhesive E is a two component material containing rubber and resin. It has a somewhat better bond strength at elevated temperature. Compositions F-I show the effect of nitrile rubber. These adhesives are characterized by high bond strength at all temperatures; however, the flow test shows that the nitrile compositions F-H are rather stiff. Composition I was worked on a paint mill at 75° F. for 10 minutes. The relative quantities of rubber, plasticizer and resin can be adjusted to achieve the desired properties in the adhesive composition. The data show that excellent adhesives can be made which contain large proportions of the low cost formolite resin.

The adhesive compositions of the present invention can contain functional materials such as fillers, solvents, thinners, antioxidants and coloring agents. Such fillers as talc, carbon black, titanium dioxide, calcium sulfate, sand, cellulosic fibers, synthetic fibers, asbestos, etc. can be employed. Extenders such as gilsonite, asphaltenes and wax can be used.

The adhesive can be shaped into any desired physical form including granules, pellets, sheets, films and rod or rope.

It is to be understood that the invention is not limited to the specific examples contained in the specification for illustration but rather is limited only by the scope of the claims.

We claim:

1. A hot melt adhesive composition comprising a homogeneous mixture of from 5 to 60 wt. percent of a polar synthetic elastomer having a Mooney viscosity of 30 to 80 and from 40 to 95 wt. percent of an aromatic hydrocarbon-aldehyde resin having a ring and ball melt point in the range of 165° to 350° F.

2. Composition according to claim 1 comprising from 10 to 30 wt. percent of a polar synthetic elastomer selected from the group consisting of butadiene-styrene copolymers, butadiene-acrylonitrile copolymers and chloroprene polymers.

3. Composition according to claim 2 wherein said polar synthetic elastomer is a butadiene-styrene copolymer.

References Cited by the Examiner

UNITED STATES PATENTS

| 2,529,260 | 11/1950 | Powers. |
| 2,916,471 | 12/1959 | Rosahl et al. ____ 260—887 XR |
| 3,000,859 | 9/1961 | Mirviss et al. |

MORRIS LIEBMAN, *Primary Examiner.*

ALEXANDER H. BRODMERKEL, *Examiner.*

A. O. DENT, B. A. AMERNICK, *Assistant Examiners.*